United States Patent [19]

Tedder

[11] 4,385,535

[45] May 31, 1983

[54] WELDED SEAL REMOVAL

[75] Inventor: Joseph A. Tedder, East Hartford, Conn.

[73] Assignee: Combustion Engineering, Inc., Windsor, Conn.

[21] Appl. No.: 211,143

[22] Filed: Nov. 28, 1980

[51] Int. Cl.³ .............................................. B23B 5/00
[52] U.S. Cl. ....................................... 82/4 R; 82/4 C
[58] Field of Search ................................. 82/4 C, 4 R

[56] References Cited

U.S. PATENT DOCUMENTS 3,078,749  2/1963  Maxner et al. ....................... 82/4 R
3,818,786  6/1974  Leshem ................................ 82/4 C Primary Examiner—Leonidas Vlachos
Attorney, Agent, or Firm—Arthur L. Wade

[57] ABSTRACT

A metal cutting machine is remotely positioned and actuated to cut away a weld formed as a seal between two surfaces of a container which houses a nuclear environment. The cutter is guided to remove the weld of the seal to a predetermined depth which maintains the integrity of the sealed surfaces that the surfaces may be resealed by a weld.

5 Claims, 2 Drawing Figures

WELDED SEAL REMOVAL

TECHNICAL FIELD

The present invention relates to the removal of a weld-seal of a container, in order to maintain, repair, or replace structure within the container. The invention further relates to mechanical removal of a weld bead, functioning as a seal between two surfaces of a container, without deforming the welded edges of the container surfaces.

BACKGROUND ART

Particularly in the nuclear field, hazardous environments are being isolated by weld-sealing them into containers. This may be an overly broad statement. More subjectively, there are many parts in and about a nuclear reactor installation which must be isolated to preclude the escape of radio-active material into the environment. Some portions, or all, of a nuclear reactor are placed in containers which are seal-welded to prevent the escape of reactive material. Obviously, the seals must be highly efficient. What may not be quite so obvious, is that the mechanism necessarily placed within the container has to be periodically inspected, maintained, and replaced. Briefly, the highly important seal of the container must be removed in such a way that it can be subsequently replaced.

In the large majority of industrial installations, when two surfaces are seal-welded, there is no need to consider subsequent breaking of the seal and reforming the seal. There are many small sealed mechanisms with which the end user is not expected to tamper. If the mechanism sealed in its container malfunctions, it is usually expected that it will be replaced—seal, housing, and all. The advent of the huge nuclear reactor installation exemplifies the change which is now taking place.

There are parts of the nuclear reactor and its control mechanism which, for safety reasons, must be isolated in containers. These are not relatively simple plug-in modules. Therefore, the containers are designed with two surfaces whose edges are welded together with the required sealing efficiency, but which must be unsealed to get at the mechanism within.

Removal of a sealing-weld bead is, broadly, a matter of applying a cutting tool to the bead to cut away the material of the bead. In contrast to the normal destructive technique, the material of replaceable beads must be removed carefully, preserving the integrity of the seal-welded surfaces so that their edges may be resealed to each other with a resealing weld bead.

Cutters to remove the material of weld beads do not have highly esoteric configurations, nor are these cutters actuated in any peculiar way by motive sources. With respect to the nuclear radiation environment, they may be operated remotely, but their actual application to the seal-weld is straight-forward. The important aspect of the actuation of the cutter bit is that it must be limited in the depth to which it is lowered. It must penetrate the weld bead to a predetermined depth to avoid deformation of the edges of the container surfaces sealed by the weld bead, while yet shaping the edges for rewelding.

DISCLOSURE OF THE INVENTION

The present invention contemplates moving an actuated cutter bit along a seal-weld bead to remove the material of the weld bead to a predetermined depth. The distance the cutter bit is moved down into the seal weld is detected by a photo-electric cell. A rotating disc is mounted on the cutter bit and provided with slits through which light is passed to the photo-electric cell as the disc rotates with the advancement of the cutter bit. The number of slits is thereby counted and the number of slits corresponding to the advancement of the bit is sensed and used as a limitation on the bit advance.

Other objects, advantages, and features of the invention will become apparent to one skilled in the art upon consideration of the written specification, appended claims and accompanying drawings.

BEST MODE FOR CARRYING OUT THE INVENTION

General Orientation

The present invention is embodied in the mechanism controlling a cutter tool bit to remove the seal of a container within which there is a nuclear radiation environment. From the outset, it is stressed that the present invention is not limited to the unsealing of containers of nuclear radiation material. The problem is to cut away a sealing-weld bead between the edges of two surfaces of a container so that resealing may be readily carried out. Therefore, the invention is realistically embodied in structure which cuts away the seal weld of any container in the way which will enable the container to be resealed.

The invention is embodied in structure which moves the cutter tool bit a predetermined depth into the weld material. The depth limitation insures the edges of the sealed surfaces are not deformed. Therefore, the edges may subsequently be efficiently resealed with weld material. Additionally, more than one tool bit may be lowered by the inventive embodiment to form the surface edges in preparation for their subsequent resealing.

The Container

Figure 1:
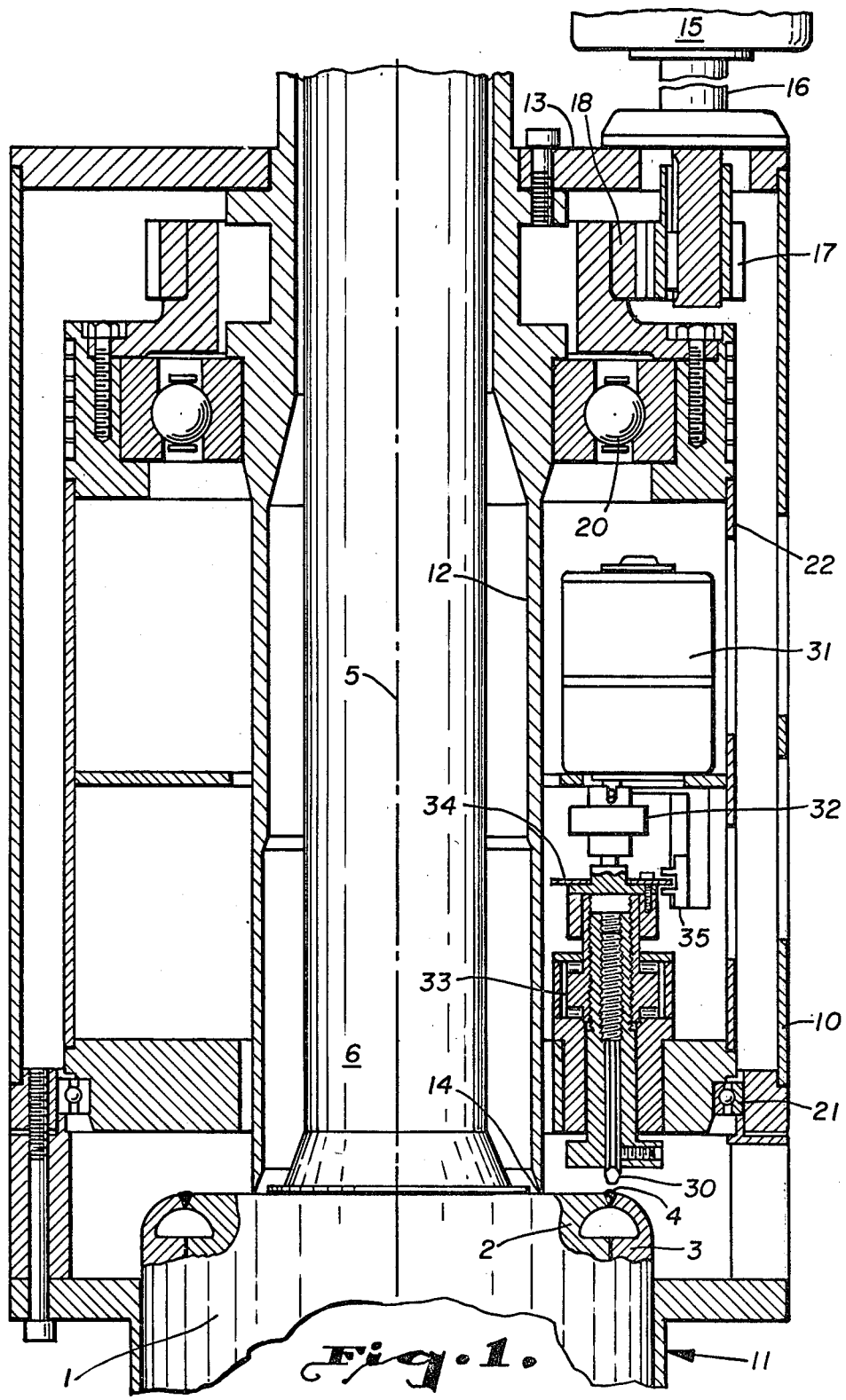
FIG. 1 is a sectioned elevation of a container whose seal-weld is being removed by a mechanism embodying the present invention as it lowers a cutter tool bit to remove the container seal.

In FIG. 1, the container 1 encloses a control arrangement necessary to operate a nuclear reactor. It is not necessary to explore the nature of this control structure, nor the reasons for its being sealed within container 1. What is important, is to stretch the mind sufficiently in formulation that container 1 is representative of any container having at least two parts. In FIG. 1, container part 2 is sealed to container part 3 with a weld bead 4 at their adjacent edges. This sealing-weld bead 4 joins the edges of the surfaces of part 2 and part 3 in a circle about an axis 5 of the container. The invention is embodied in structure which lowers a cutter tool bit a predetermined depth into seal 4 to cut away enough of its material to part container portions 2 and 3.

It is pointed out that container part 2 has a peculiar shape. The center of container part 2 rises in a column 6 which, as far as FIG. 1 is concerned, extends for an undetermined distance upward. The cutting structure which removes seal 4 is lowered over this column 6 to position the cutting tool into the weld bead 4. To accommodate this column 6 of the container top, the housing for the cutter provides a hollow shaft up through which column 6 extends.

Outer Cylinder Housing

Outer housing 10 is a cylinder which is lowered around column 6 and engages the container part 3 at 11. The cylinder 10 is clamped to container part 3 at 11 to basically orient the cutting structure within housing 10 relative to seal 4.

Housing 10 is completed with cylindrical support shaft 12. With outer housing 10 and inner support shaft 12 joined at partition 13, there is formed a housing comprised of one cylindrical member within another cylindrical member, with an annular volume between them. Support shaft 12 rests upon container part 2 at 14 while outer cylinder 10 is engaging the container at 11. For additional stabilization, support shaft 12 is clamped to column 6 of the container. Thus concentricity is maintained between support shaft 12 and column 6.

Within the annulus of housing 10,12,13, the mechanisms which lower cutting tool bits into seal 4 are rotated about axis 5. Lowered their predetermined distance into seal 4, these cutter tool bits remove seal 4 and shape the edges of the surfaces of container parts 2 and 3 so that resealing can be carried out efficiently after the mechanism within container 1 has been inspected, maintained, or replaced.

Internal Organization Within Housing 10,12,13

The structures raising and lowering the cutter tool bits within housing 10,12,13 are rotated about axis 5 with motor 15. Motor 15 extends its shaft 16 down to spur gear 17. Ring gear 18 is mounted on the internal structure which raises and lowers the cutter tool bit. Therefore, rotation of spur gear 17, as it engages ring gear 18, rotates the cutter tool bits within housing 10,12,13.

In FIG. 1, the inner structure is connected to the support shaft 12 through bearing 20, and to outer cylinder housing 10 through bearing 21. The result is, that the operation of motor 15 rotates the inner cylinder 22 on bearings 20 and 21 to carry the cutter tool around the axis 5 and over the seal 4.

Inner Cylinder Housing 22

Inner cylinder housing 22 rotates about center line 5. This housing rotates on bearings 20 and 21. The rotation is brought about by the actuation of motor 15. Mounted within and on this inner cylinder housing 22 is the up-/down structure actuating cutter tool bit 30.

Vertically positioned, cutter tool bit 30 is actuated by motor 31. Mounted on inner cylinder housing 22, motor 31 rotates torque-limiting shaft 32. The lower end of torque-limiting shaft 32 is connected to screw adapter 33. Also, disc 34 is rotated by shaft 32. The edge of disc 34 is rotated through photo-electric switch 35, mounted on the wall of inner cylinder 22.

Slots in disc 34 are passageways for light within switch 35. With these slots spaced in disc 34, the rotation of screw adapter 33 is sensed and use is made of this signal as disclosed in subsequent FIG. 2.

Screw adapter 33 rotates through a threaded connection with cutter tool bit 30, converting the rotary motion of motor 31 into vertical motion of a holder for bit 30.

Operation of the structure has been explained, along with the orientation of the structural components to each other. In summary, first motor 15 is actuated to carry bit 30 over the length of sealing-weld bead 4. Second motor 31 is actuated to vertically adjust bit 30 to engage, or disengage, bit 30 with weld bead 4. Disc 34 cooperates with switch 35 to index the vertical position of cutter tool bit 30 in order to lower bit 30 the precise distance into weld bead 4 which will remove weld bead 4 without deforming the edges sealed by bead 4. Further details of the structure between second motor 31 and bit 30 are disclosed in FIG. 2.

Connection Between Motor 31 and Bit 30

Figure 2:
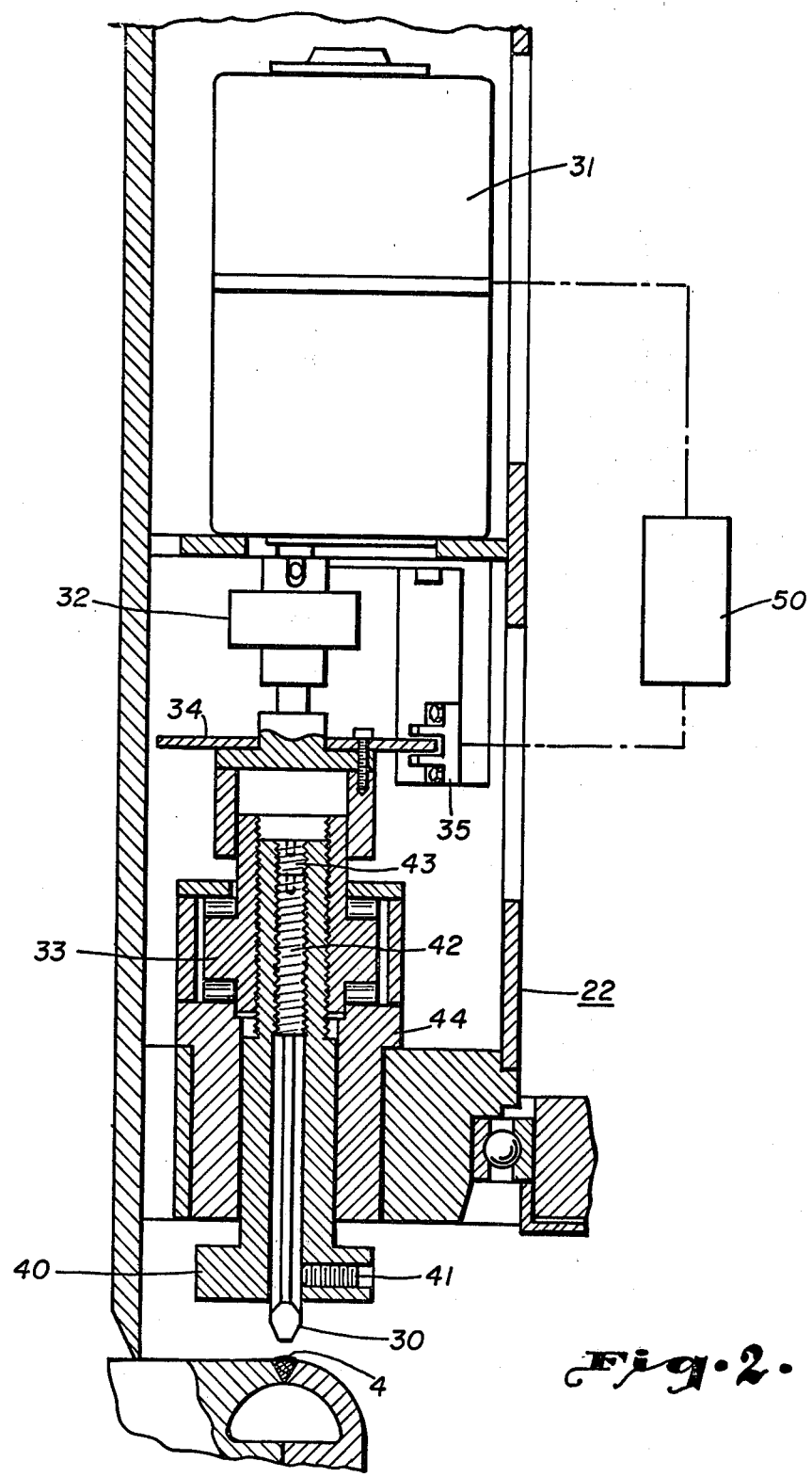
FIG. 2 is a sectioned elevation of the mechanism of FIG. 1 which raises and lowers the seal-cutting tool.

FIG. 2 is simply a duplicate of the structure between torque-limiting shaft 32 and the housing for the cutter tool bit 30. The scale of FIG. 1 did not permit a satisfactory disclosure of the details of this important structure. It is imperative that it be crystal clear how the rotary motion of motor 31 is converted into the vertical motion for bit 30.

Bit 30 is mounted in holder 40. A central opening is drilled to accommodate elongated bit 30. Bit 30 is extended up into the opening of bit holder 40 and is positioned by set screws 42 and 43, and clamped with set screw 41. Bit holder 40 is, in turn, channeled through an opening in the lower end of guide member 44 which is, in turn, mounted in fixed relation to inner cylinder 22. The external shape of bit holder 40 and the internal shape of the opening through the lower end of guide 44 can be any geometrical, cross-sectional shape which will permit only vertical travel of bit holder 40 and the bit 30 mounted axially therein.

The upper end of bit holder 40 is externally threaded. Motor 31 rotates structures 32, 33 and 34 which engage the upper threaded end of bit holder 40. Through the engagement between the rotating structure and the threaded upper end of bit holder 40, bit holder 40 is caused to travel linearly in guide 44.

More specifically, the lower end of screw adapter 33 is enclosed in the upper end of guide 44. Suitable bearings are arranged between guide 44 and adapter 33 to facilitate rotation of 33. A force of rotation is provided through screw adapter 33 which is, as heretofore described, attached to torque-limiting shaft 32. The vital connection between the rotated and reciprocated structures is the internal threads of adapter 33 and external threads on the upper end of bit holder 40. Therefore, as screw adapter 33 is rotated, it forces bit holder 40, which cannot rotate, to move either upward or downward in guide 44, depending upon the direction of rotation. The linear travel per revolution of motor 31 output shaft is a function of the pitch of the thread common to 33 and 40. The non-circular cross-section at the lower end of bit holder 40, sliding into its non-circular guide 44, prevents rotation of 40.

The operation of the foregoing structural combination is more or less apparent from the preceding disclosure. With bit 30 centered over seal 4 and lowered to a predetermined distance above the seal, set screws 41, 42 and 43 lock the bit into position within bit holder 40. Motor 31 is then actuated to rotate screw adapter 33 in the direction of rotation which will project bit 30 into seal 4. As the rotation of disc 34 is caused by the rotation of motor 31, the radial slots in the disc pass the light of switch 35 to a sensing cell within the switch. The number of disc slots and the screw pitch are selected so that the rotation from one slot to the next through switch 35 is a 0.001 of an inch indication of the vertical movement of bit 30. The impulses representative of bit 30 movement are transmitted from switch 35 to a control station 50. These signals from switch 35 are then processed in control station 50 and applied to the control of motor 31 to predetermine its rotation and consequent precise advancement of bit 30 into the seal 4. Thus, the travel of bit 30 along the length of bead 4 by first motor 15 and the concomitant descent of bit 30 by second motor 31, machines seal 4 as the end result achieved by the present invention. In accord with the best mode embodiment of the invention, the motors 15 and 31 are each preferably variable speed so as to enable the speed thereof to be adjusted should a need therefor arise. Further, slip-rings are normally interposed between the driving members and the rotating parts for purposes of transmitting electrical signals and power from the stationary side to the rotating components.

Conclusion

All of the foregoing disclosure has concentrated upon the manipulation of cutter bit 30 to basically remove seal 4. Attention is now drawn to the fact that the housing 10,12,13 usually contains a second bit-actuating structure stationed on the other side of axis 5. No need is felt to duplicate the disclosure of this second bit actuation. The bit is simply provided with a shape which will subsequently work the edges of the surfaces previously worked by bit 30. This shape of the second bit will provide the predetermined cutting and shaping of these edges which will facilitate the application of a subsequent bead of seal material when the time arrives to reseal container 1, i.e., replace seal 4. More specifically, in accord with the preferred mode of operation, the first bit, i.e., 30 removes approximately ¾ths of the seal weld, whereupon the second bit is rendered operative for purposes of removing the remainder of the seal weld, as well as for purposes of shaping the edges for rewelding. Commonly, the second bit, which shapes the edges, is brought into operation before the first bit cuts through the seal weld. Further, a suitable gauge of conventional construction may be cooperatively associated with the structure of the invention for purposes of establishing the depth of the cut made by the first and second bits.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. An apparatus for unsealing two surfaces which are sealed at their edges with a bead of sealing weld material, including,
   a pair of surfaces sealed at their edges by a bead of weld material,
   a cutter tool bit having a cutting edge shaped and positioned to machine away material from the bead,
   structure holding the tool bit edge in position over the bead and defining a travel path for the bit the length of the bead,
   a first motor connected to the bit-holding structure arranged to travel the bit along the bead length,
   a second motor,
   a connection between the second motor and the bit arranged to move the bit edge vertically into machining engagement with the bead as the bit travels the length of the bead,
   a plate connected to the second motor,
   slots formed in the plate,
   a photo-electric switch arranged relative to the plate slots so that light through the slots will actuate the switch as the plate is rotated by the motor,
   and means including the photo-electric switch to predetermine the motor rotation and bit advance into the seal weld in accordance with the number of plate slots passed through the switch.

2. The apparatus of claim 1, in which,
   the connection between the second motor and the tool bit includes a threaded member connected to the bit which translates the rotary motion of the second motor into linear bit advance into the weld bead,
   whereby the number of slots in the plate passing through the photo-electric switch represents the linear advance of the bit into the weld bead.

3. An apparatus for the control of a cutter tool bit, including,
   a seal-weld bead forming a union with the edges of two container surfaces which it is desired to remove and replace,
   a first housing mounted in fixed relationship to the seal-weld bead,
   a second housing structure mounted within the first housing structure and movable the length of the seal-weld bead,
   a first motor mounted on the first housing structure and connected to travel the second housing structure along the seal-weld bead length,
   a second motor mounted on the second housing,
   a cutter tool bit mounted on the second housing and provided a vertical path along which the bit is movable downward to engage the seal-weld bead,
   a connection between the second motor and the bit which translates the rotation of the motor into vertical movement of the bit along its vertical path,
   means for sensing the rotation of the second motor and processing the signals of rotation into vertical bit movement,
   and means for controlling the second motor in response to the processed signals of rotation to predetermine the vertical distance the bit moves in machining the seal material as the first motor travels the bit the length of the seal bead.

4. The structure of claim 3, in which,
   the means for sensing the rotation of the second motor is a plate with spaced openings,
   a photo-electric switch positioned to transmit its light through the plate openings to establish the signals of rotation,
   whereby the transmitted light pulses through the plate openings are processed as signal pulses to predetermine the rotation of the second motor.

5. The structure of claim 3, in which,
   the vertical movable bit structure has an external threaded upper portion engaged by the rotating structure of the second motor to translate the rotation of the second motor into the vertical movement and position of the bit.

* * * * *